United States Patent

Watson, Jr.

[11] 4,014,527
[45] Mar. 29, 1977

[54] CHEMICAL BLENDING SYSTEM

[75] Inventor: Wilson D. Watson, Jr., Midland, Tex.

[73] Assignee: Mobil Oil Corporation, New York, N.Y.

[22] Filed: Jan. 23, 1975

[21] Appl. No.: 543,394

Related U.S. Application Data

[62] Division of Ser. No. 426,843, Dec. 20, 1973, Pat. No. 3,902,558.

[52] U.S. Cl. .............................. 259/151; 259/147
[51] Int. Cl.² .......................................... B28C 5/06
[58] Field of Search ................. 259/4, 18, 36, 147, 259/151

[56] References Cited

UNITED STATES PATENTS

| | | | |
|---|---|---|---|
| 3,237,805 | 3/1966 | Stogner | 259/151 |
| 3,425,669 | 2/1969 | Gaddis | 259/18 |
| 3,767,170 | 10/1973 | Morgenstern | 259/147 |
| 3,782,695 | 1/1974 | Sandiford | 259/18 |
| 3,819,157 | 6/1974 | Markfelt | 259/4 |

*Primary Examiner*—Richard E. Aegerter
*Assistant Examiner*—L. Footland
*Attorney, Agent, or Firm*—C. A. Huggett; Henry L. Ehrlich

[57] ABSTRACT

This specification discloses a system and method for blending a dry chemical and a liquid. The system is comprised of a hopper for receiving and feeding the dry chemical into a pipe where it is transported by gas to a liquid weir and there mixed with the liquid. The hopper is adapted for having a positive pneumatic pressure applied at an upper location thereof and a negative pneumatic pressure applied at a lower location thereof to feed the dry chemical into a pipe. The dry chemical is then transported by gas through the pipe and directed from the downstream end of the pipe into the liquid weir. The liquid weir is adapted for having liquid flowed therethrough to mix and blend the liquid with the dry chemical. A container is provided to contain the blended mixture.

7 Claims, 3 Drawing Figures

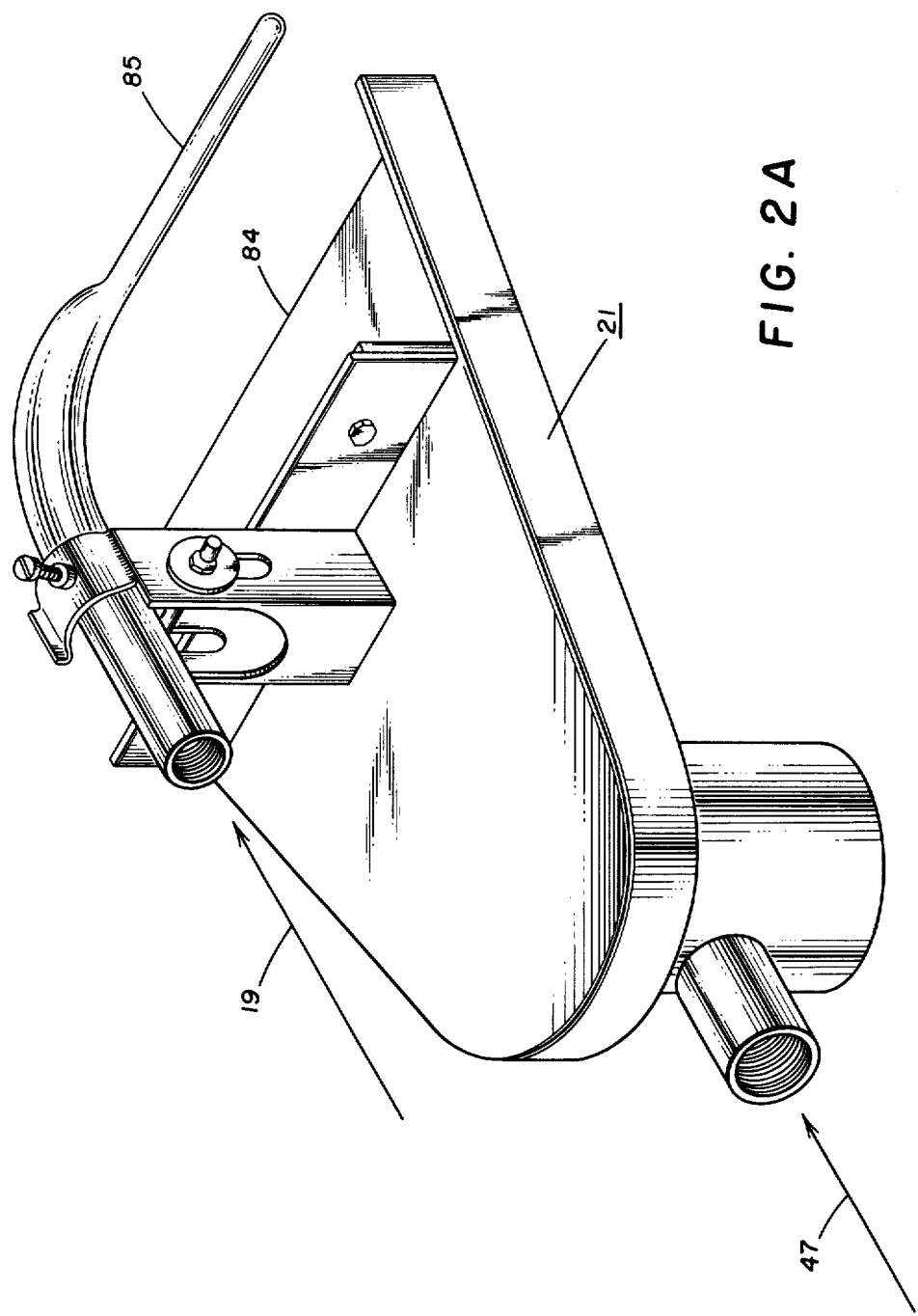

CHEMICAL BLENDING SYSTEM

CROSS REFERENCE TO RELATED APPLICATION

This is a division of application Ser. No. 426,843 filed Dec. 20, 1973, now U.S. Pat. No. 3,902,558, issued Sept. 2, 1975.

SUMMARY OF THE INVENTION

This invention is directed to a system for blending a dry chemical and a liquid. This system is comprised of a hopper which is adapted for receiving and feeding the dry chemical. The hopper is adapted for having a positive pneumatic pressure applied at an upper location thereof and for maintaining therein the positive pneumatic pressure. There is provided a means for applying a negative pneumatic pressure to the lower end of the hopper to feed the dry chemical into a conduit. A means is provided for supplying gas under pressure to an upstream end of the conduit to transport the dry chemical. There is provided a means for forming a free-falling sheet of liquid and another means for supplying liquid to the means for forming a free-falling sheet of liquid. A means is provided for directing the flow of the gas and dry chemical from the downstream end of the conduit into a free-falling sheet of liquid formed by the means for forming a free-falling sheet of liquid to blend the dry chemical and the liquid.

BRIEF DESCRIPTION OF THE DRAWINGS

FIGS. 2A and 2B are isometric end views illustrating a liquid weir for blending a dry chemical with a liquid.

BACKGROUND OF THE INVENTION

This invention is directed to a method of blending a dry chemical with a liquid.

It is desirable in many applications to mix or blend dry chemicals of the type which flow freely, e.g. powdery dry chemicals, with a liquid and form a blended mixture. An application where large volumes of dry chemicals are mixed or blended with a liquid is in the recovery of oil from an oil-containing subterranean formation wherein a viscous liquid is injected via an injection well into the oil-containing subterranean formation to assist in the recovery of oil therefrom. The viscous liquid may be a polymer solution formed by blending or mixing a dry polymer with an aqueous fluid. Examples of such polymers are partially hydrolyzed polyacrylamides which are sold by Calgon Corporation under the trade name of "Calgon 454" and polysaccharides which are sold by Kelso Corporation under the trade name of "Kelzan." These polymers, as well as many other dry chemicals, are soluble in a liquid, but have a tendency to polymerize, gum or ball-up when brought into contact with the solubilizing liquid. Furthermore, this tendency presents problems due to the humidity naturally present in the air when using equipment such as hoppers and associated equipment for feeding and blending the polymers and dry chemicals with a solubilizing liquid. In the case of hoppers it has been found that the polymers and dry chemicals do not fall freely therefrom. Vibrators and screw conveyors have been used in conjunction with hoppers to assist in feeding and conveying the polymers and dry chemicals from the hoppers.

DESCRIPTION OF THE PREFERRED EMBODIMENTS

In accordance with this invention there is provided a system and method for feeding and blending dry chemicals with a liquid.

This invention is applicable for blending liquid with a dry chemical of the type that may be flowed from a hopper. A particular application of this invention is in conjunction with polymer waterfloods that are carried out in the recovery of oil from oil-containing subterranean formations. Therefore, for illustrative purposes, this invention is described in its application to feeding and blending a polymer with water to form a viscous liquid for use in the recovery of oil from an oil-containing subterranean formation.

Figure 1:
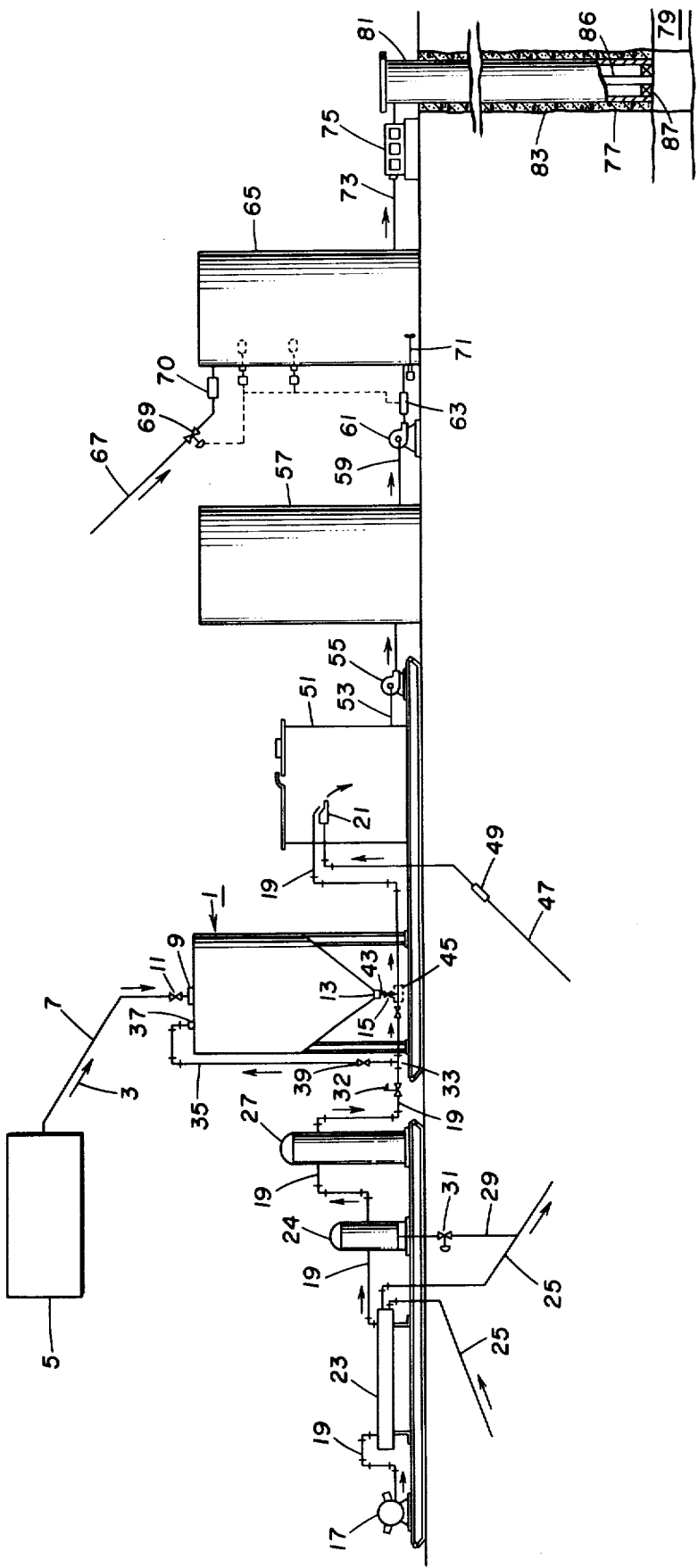
FIG. 1 is a flow sheet which illustrates schematically the system and method of this invention.

Referring to FIG. 1 there is shown a flow sheet illustrating the system of this invention. A hopper 1 is shown for receiving dry polymer 3 from, for example, a polymer storage 5 via a conduit 7. The polymer 3 may be injected into the hopper 1 through an inlet 9. A valve 11 is provided in the conduit 7 for opening and closing the conduit 7. The lower part of the hopper 1 slopes inwardly toward the vertical axis of the hopper and an outlet port 13 is provided at the lower extremity thereof. A valve 15 is provided in a conduit 43 that connects the outlet port 13 with a conduit 19.

An air source 17 is provided which may be, for example, an air compressor. Air is flowed from the air source 17 through the conduit 19 to a means for forming a free-falling sheet of liquid, hereafter referred to as a water weir 21. A portion of the air flowing through the conduit 19 is flowed through a connecting conduit 35 and into an upper location of the hopper 1. Preferably the air is treated to remove water vapor therefrom and to provide dry air for flowing into the upper location of the hopper 1 and for transporting the dry polymer 3 from the hopper 1 via conduit 19 to the water weir 21. The dry air may be provided by dehumidifying the air prior to its coming into contact with the polymer 3. A system is illustrated for dehumidifying the air which makes use of a water-type air cooler 23. The air is passed through the water-type air cooler 23 and water from a water source (not shown) is circulated via pipe 25 through the air cooler 23 and then is exhausted to a water storage or disposal system (not shown). The air is then flowed from the air cooler 23 via the conduit 19 to an air scrubber 24 to further dehumidify and clean the air and thence flowed through the conduit 19 to an air volume tank 27. A pipe 29 and automatic dump valve 31 are provided to exhaust the water removed from the air to the water disposal system. The air is flowed from the volume tank 27 via the conduit 19 to an air pressure regulator 32 to regulate the pressure as desired. The air stream flowing through the conduit 19 is split at point 33 and a first part of the air is flowed through the conduit 35 and through inlet 37 into the hopper 1 above the polymer 3 contained therein. A valve 39 may be provided in the conduit 35 for controlling the flow of the air therethrough. The air which flows through the conduit 35 and into the upper part of hopper 1 serves the purpose of providing a positive pneumatic pressure above the polymer 3 in hopper 1 and thus assists in forcing the polymer 3 to flow from the hopper 1 through the exit port 13 thereof. The use of dry air eliminates other problems which commonly occur in the blending of polymer with water such as polymerizing and gumming up of the polymer within the hopper 1 and, in particular, in the vicinity of the exit port 13 of hopper 1.

The second part of the air flows past point 33 toward the downstream end of the conduit 19. The exit port 13 of the hopper 1 is connected via the conduit 43 and the valve 15 to the conduit 19. An induction valve 45 illustrated by the dashed rectangle is provided to connect the conduit 19 with the conduit 43 and to provide a suction pressure on exit port 13. This suction pressure is a pressure which is less than the pressure applied above the polymer 3 within hopper 1 and is hereafter referred to as a negative pressure. A negative pressure may be applied by other means than an induction valve, for example, by connecting a vacuum pump to the exit port 13. However, an induction valve is a practical means of applying this negative pressure and is the preferred means for use in this system. The negative pressure which is applied to the exit port 13 works in conjunction with the positive pressure applied within the hopper 1 above the polymer 3 and with the force of gravity to cause the polymer 3 to flow downward through the exit port 13 and into the conduit 19 where it is entrained by the air flowing therein and is transported downstream through the conduit 19. The air and dry polymer exit at the downstream end of the conduit 19 into the water weir 21. Water from a water source (not shown) is flowed through a pipe 47 to the water weir 21. A meter 49 may be provided in the pipe 47 to meter the water flowing therethrough. The water weir 21 spreads the water into a free-falling sheet of water and allows it to fall into a tank 51. The polymer and air exiting from the downstream end of the conduit 19 are directed to this water weir where the polymer 3 is sprayed on the free-falling sheet of water to mix and blend the polymer with the water. A nozzle 85, FIG. 2A, may be employed at the downstream end of the conduit 19 to better spay and direct the polymer onto the sheet of water formed by the water weir.

Figure 2B:
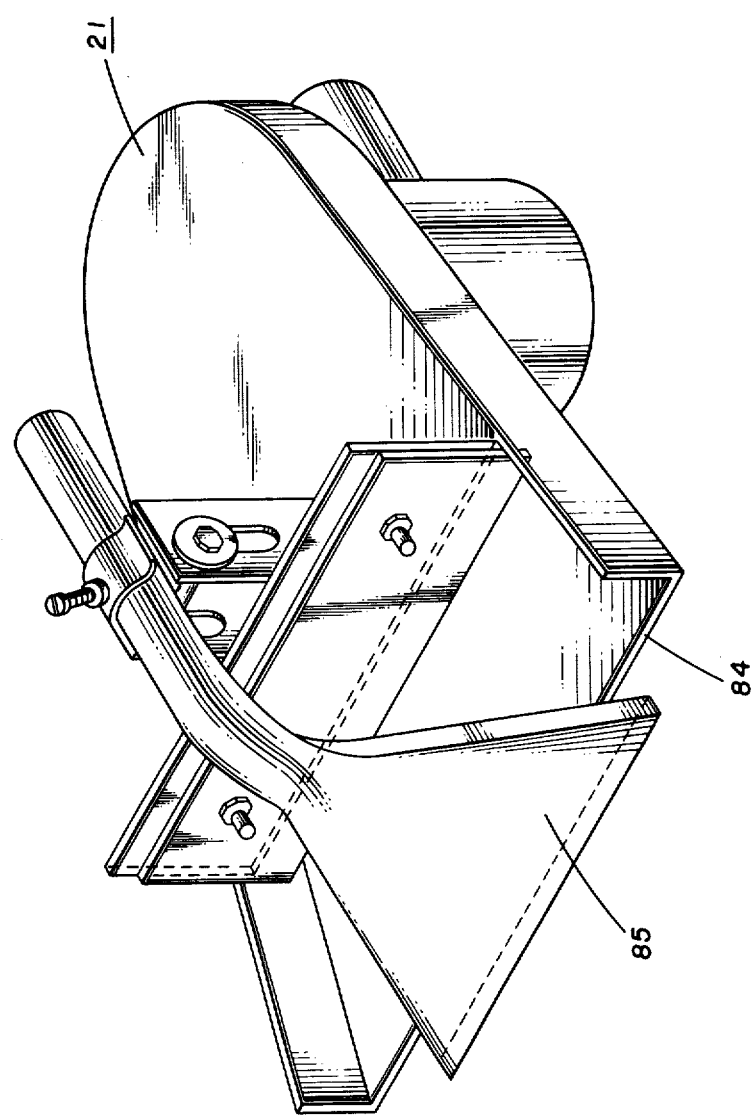

Referring to FIGS. 2A and 2B, there is shown isometric end views of the water weir 21. The pipe 47 connects with the water weir 21 and water in a metered amount is flowed through the pipe 47 and into the water weir 21. The water flows through the water weir 21 and over the edge 84 to form a sheet of water (not shown) which falls into and is contained by the tank 51 of FIG. 1. The air containing the entrained polymer flows from the conduit 19 and is directed into the sheet of water falling over the edge 84 of the water weir 21 where the polymer is readily blended with the water. Preferably a nozzle 85 is attached to the downstream end of the conduit 19 to "spray" the air and polymer into the sheet of water. Preferably the nozzle 85 is a type which directs the air and polymer exiting from the conduit 19 into a flat spray to better contact and blend the polymer with the water.

The blended aqueous mixture of polymer may then be transferred from the tank 51 via a pipe 53 and pump 55 to a holding tank 57. The blended solution of polymer may then be transferred from the holding tank 57 through a pipe 59 and another transfer pump 61 to a suction tank 65. A meter 63 may be provided for metering the fluid transferred from the holding tank 57 into the suction tank 65. Fresh water from a water source (not shown) may be injected through a pipe 67, valve 69, and meter 70 into the suction tank 65, and a mechanical blender 71 located therein may be used to further blend fresh water with the polymer solution, thus diluting the solution as desired.

In applying this invention to the recovery of oil from an oil-containing subterranean formation, the viscous liquid or polymer solution is injected via an injection well 77 and into the subterranean formation 79. The well 77 may be conventionally completed as an injection well. There is shown in the well 77 a casing 81 which extends to about the top of the formation 79 and is cemented in place by a cement sheath 83. A tubing string 86 may extend down the casing 81 and communicate with the formation 79. A packer 87 is shown isolating the lower end of the tubing string 86 from the interior of the casing 81. The polymer solution is transferred via a line 73 and injection pump 75 to the well 77 and injected down the tubing 86 and into the subterranean formation 79 and is driven therethrough to assist in the recovery of oil therefrom.

I claim:

1. A system for blending a dry chemical and a liquid comprising, the combination of:
   a. a hopper adapted for receiving and feeding said dry chemical, said hopper being adapted for having a positive pneumatic pressure applied thereto and for maintaining therein said positive pneumatic pressure;
   b. a conduit communicating with a lower portion of said hopper;
   c. a means for applying said positive pneumatic pressure to an upper location of said hopper;
   d. a means for applying a negative pneumatic pressure to the lower portion of said hopper to feed said dry chemical into said conduit;
   e. a means for supplying gas under pressure to an upstream end of said conduit to transport said dry chemical;
   f. a means for dehumidifying said gas connected into sid conduit upstream of said hopper;
   g. a means for forming a free-falling sheet of liquid;
   h. a means for supplying liquid to said means for forming a free-falling sheet of liquid; and
   i. a means for directing the flow of said gas and said dry chemical from the downstream end of said conduit into a free-falling sheet of liquid formed by said means for forming a free-falling sheet of liquid to blend said dry chemical and said liquid.

2. The system of claim 1 wherein said means of applying a negative pneumatic pressure is an eduction valve.

3. A system for blending a dry polymer and water comprising, the combination of:
   a. a hopper adapted for receiving and feeding said dry polymer, said hopper being adapted for having a positive pneumatic pressure applied thereto;
   b. a first conduit communicating with the lower portion of said hopper;
   c. a means for applying said positive pneumatic pressure to an upper location of said hopper;
   d. a means for applying a negative pneumatic pressure to the lower portion of said hopper to feed said dry polymer into said first conduit;
   e. a means for supplying gas under pressure to an upstream end of said first conduit in a sufficient volume to transport said dry polymer;
   f. a means for dehumidifying said gas upstream of said hopper;
   g. a means for forming a free-falling sheet of water;
   h. a second conduit for supplying water to said means for forming a free-falling sheet of water; and i. a means for directing the flow of said gas and said dry polymer from the downstream end of said first conduit into a free-falling sheet of water formed by said means for forming a free-falling sheet of water to blend said dry polymer and said water.

4. The system of claim 3 further comprising a pressure regulator connected into said first conduit downstream of said means for dehumidifying said gas and upstream of said hopper.

5. The system of claim 4 wherein said means for applying said positive pneumatic pressure to an upper location of said hopper is a third conduit interconnecting said hopper with said first conduit downstream of said regulator and upstream of said hopper.

6. A system for blending a dry chemical and a liquid, comprising the combination of:
 a. a hopper adapted for receiving and feeding said dry chemical, said hopper being adapted for having a positive pneumatic pressure above atmospheric applied thereto and for maintaining therein said positive pneumatic pressure above atmospheric;
 b. a conduit communicating with a lower portion of said hopper;
 c. a means for applying said positive pneumatic pressure above atmospheric to an upper location of said hopper;
 d. a means for applying a negative pneumatic pressure to the lower portion of said hopper to feed said dry chemical into said conduit;
 e. a means for supplying gas under pressure to an upstream end of said conduit to transport said dry chemical;
 f. a means for forming a free-falling sheet of liquid;
 g. a means for supplying liquid to said means for forming a free-falling sheet of liquid; and
 h. a means for directing the flow of said gas and dry chemical from the downstream end of said conduit into a free-falling sheet of liquid formed by said means for forming a free-falling sheet of liquid to blend said dry chemical and said liquid.

7. A system for blending a dry polymer and water comprising, the combination of:
 a. a hopper adapted for receiving and feeding said dry polymer, said hopper being adapted for having a positive pneumatic pressure above atmospheric applied thereto;
 b. a first conduit communicating with the lower portion of said hopper;
 c. a means for applying said positive pneumatic pressure above atmospheric to an upper location of said hopper;
 d. a means for applying a negative pneumatic pressure to the lower portion of said hopper to feed said dry polymer into said first conduit;
 e. a means for supplying gas under pressure to an upstream end of said first conduit in a sufficient volume to transport said dry polymer;
 f. a means for forming a free-falling sheet of water;
 g. a second conduit for supplying water to said means for forming a free-falling sheet of water; and
 h. a means for directing the flow of said gas and dry polymer from the downstream end of said first conduit into a free-falling sheet of water formed by said means for forming a free-falling sheet of water to blend said dry polymer and water.

* * * * *